United States Patent
Watanabe et al.

(10) Patent No.: US 7,328,739 B2
(45) Date of Patent: Feb. 12, 2008

(54) HEAT EXCHANGER FOR VEHICLE

(75) Inventors: Toshiharu Watanabe, Sano (JP); Naohisa Kamiyama, Ashikaga (JP); Nobuyasu Suematsu, Sano (JP)

(73) Assignee: Calsonic Kansei Corporation (JP)

( * ) Notice: Subject to any disclaimer, the term of this patent is extended or adjusted under 35 U.S.C. 154(b) by 350 days.

(21) Appl. No.: 10/777,943

(22) Filed: Feb. 12, 2004

(65) Prior Publication Data

US 2004/0206474 A1 Oct. 21, 2004

(30) Foreign Application Priority Data

Feb. 14, 2003 (JP) ............ P 2003-036770
Feb. 18, 2003 (JP) ............ P 2003-039931

(51) Int. Cl.
*B60H 1/00* (2006.01)

(52) U.S. Cl. ............ 165/41; 165/51; 165/43; 165/140

(58) Field of Classification Search ............ 165/41, 165/42, 43, 44, 51, 140; 123/41.1, 41, 51
See application file for complete search history.

(56) References Cited

U.S. PATENT DOCUMENTS

| | | | | |
|---|---|---|---|---|
| 4,535,729 | A | * | 8/1985 | Faylor ............ 123/41.1 |
| 4,651,816 | A | * | 3/1987 | Struss et al. ............ 165/140 |
| 5,046,554 | A | * | 9/1991 | Iwasaki et al. ............ 165/140 |
| 5,086,835 | A | * | 2/1992 | Shinmura ............ 123/41.51 |
| 5,316,079 | A | * | 5/1994 | Hedeen ............ 165/140 |
| 5,526,873 | A | * | 6/1996 | Marsais et al. ............ 165/51 |
| 5,720,341 | A | * | 2/1998 | Watanabe et al. ............ 165/140 |
| 6,230,793 | B1 | | 5/2001 | Sumida |
| 6,793,012 | B2 | * | 9/2004 | Fang et al. ............ 165/140 |
| 6,904,963 | B2 | * | 6/2005 | Hu ............ 165/140 |
| 6,942,023 | B2 | * | 9/2005 | Fang et al. ............ 165/140 |
| 7,108,049 | B2 | * | 9/2006 | Makino et al. ............ 165/140 |
| 2002/0023735 | A1 | | 2/2002 | Uchikawa et al. |

FOREIGN PATENT DOCUMENTS

| | | |
|---|---|---|
| EP | 0522 471 A1 * | 1/1993 |
| EP | 0 599 107 A2 | 6/1994 |
| EP | 0 855 566 A2 | 7/1998 |
| EP | 0 857 935 A2 | 8/1998 |
| JP | 09-329372 | 12/1997 |
| JP | 10-206074 | 8/1998 |
| JP | 10-281688 | 10/1998 |
| JP | 11-153395 | 6/1999 |
| JP | 2000-018880 | 1/2000 |
| JP | 2000-103226 | 4/2000 |
| WO | WO 03/106910 A1 | 12/2003 |

* cited by examiner

*Primary Examiner*—Ljiljana Ciric
(74) *Attorney, Agent, or Firm*—Kilpatrick Stockton LLP

(57) ABSTRACT

The heat exchanger includes a condenser and a refrigerant passage connected to the condenser. The refrigerant passage allows a refrigerant to flow into and flow out of the condenser in opposite directions. As a result, the refrigerant passage can be provided on one side of the condenser with an inlet and an outlet facing the same direction. The connection between the refrigerant passage and the air conditioning system is carried out on one side of the condenser only, improving the operative efficiency.

3 Claims, 11 Drawing Sheets

HEAT EXCHANGER FOR VEHICLE

BACKGROUND OF THE INVENTION

The present invention relates to a heat exchanger for a vehicle. More particularly, the present invention relates to a connecting structure of a heat exchanger having a condenser arranged in front of a radiator.

In a vehicle, generally, an engine room is provided, on its front side, with an automotive heat exchanger including a radiator for cooling engine cooling water, a condenser for condensing air conditioning refrigerant, an oil cooler for cooling transmission oil of an automatic transmission of the vehicle, etc.

In these constituents of the heat exchanger, the condenser is formed by a core part as heat exchanging area and upper and lower pipes connected to the core part. Being arranged above and below the core part, the above pipes serve to supply and discharge the refrigerant to and from the core part.

In detail, the upper pipe is provided, at one end thereof, with an inlet for introducing the refrigerant, which has been fed from an air conditioning cycle, into the refrigerant passage in the pipe and further the core part. While, the lower pipe is provided, at an end thereof on the opposite side of the inlet of the upper pipe, with an outlet for the refrigerant. These inlet and outlet of the pipes are connected to pipes on the side of the air conditioning cycle through the intermediary of corresponding blocks. In this way, the condenser does form a part of the air conditioning cycle (Japanese Patent Publication No. 2000-18880).

In the conventional structure, the inlet and the outlet are positioned above and below the core part and also in opposite positions in the horizontal direction, as mentioned above. Therefore, when connecting the air conditioning cycle to the condenser, an operator has to change an operator's posture left, right, up and down whenever connecting each block to the inlet and outlet of the refrigerant passages above and below the core part. For such a reason, the above structure is disadvantageous in view of working efficiency.

SUMMARY OF THE INVENTION

In such a situation, it is an object of the present invention to provide a heat exchanger for a vehicle, which is capable of improvement in working efficiency in the connecting operation to connect the condenser with the air conditioning cycle.

According to the first aspect of the present invention, the above-mentioned object is accomplished by a heat exchanger for a vehicle, comprising: a radiator arranged in an engine room, for cooling a cooling water for an engine of the vehicle; and a condenser arranged in front of the radiator in a traveling direction of the vehicle, for cooling a refrigerant for an air conditioning cycle of the vehicle, the condenser including a condenser core part allowing the refrigerant to flow therein and a refrigerant passage arranged on at least either side of the condenser core part in the vertical direction of the heat exchanger and also communicated with the condenser core part, wherein the refrigerant passage is formed so as to allow the refrigerant to flow therein in mutually-opposite directions, and the refrigerant passage is provided, on one side thereof in the horizontal direction of the heat exchanger, with an inlet through which the refrigerant is introduced into the refrigerant passage and an outlet through which the refrigerant is discharged from the refrigerant passage.

By forming the refrigerant passage so as to allow the refrigerant to flow therein in mutually-opposite directions, it is possible to form both of the inlet and the outlet for the refrigerant on one side of the refrigerant passage in the horizontal direction of the heat exchanger. Thus, an operator's connecting operation of the heat exchanger with the air conditioning cycle can be carried out on one side of the condenser in the horizontal direction, whereby the efficiency of the connecting operation can be improved.

According to the second aspect of the present invention, in the above heat exchanger, a vertical height of the condenser is smaller than a vertical height of the radiator.

Owing to the above relationship in vertical height between the condenser and the radiator, in the front view of the heat exchanger, there can be defined, above or below the radiator, a space that allows the refrigerant passage to be enlarged, thereby realizing the above structure of the refrigerant passage allowing the refrigerant to flow therein in mutually-opposite directions.

According to the third aspect of the present invention, in the above heat exchanger, the refrigerant passage is partially partitioned to upper and lower passages, thereby allowing the refrigerant to flow in the refrigerant passage in the mutually-opposite directions.

In this case, by partitioning the refrigerant passage to the upper and lower passages, it is possible to provide the refrigerant passage with a structure enabling the refrigerant to flow in the mutually-opposite directions.

According to the fourth aspect of the present invention, in the above heat exchanger, the refrigerant passage is formed by pipe members juxtaposed vertically to extend in the horizontal direction of the heat exchanger, the pipe members being communicated with each other through a communication part, thereby allowing the refrigerant to flow in the refrigerant passage in the mutually-opposite directions.

In this case, owing to the adoption of the juxtaposed pipe members as an element providing the refrigerant passage, it is possible to provide the above structure of the refrigerant passage with ease.

According to the fifth aspect of the present invention, the above heat exchanger further comprises an oil cooler for cooling a transmission oil of the engine, the oil cooler including an oil-cooler core part allowing the transmission oil to flow therein, wherein the refrigerant passage is communicated with the condenser core part in a manner that the refrigerant introduced into the refrigerant passage via the inlet flows in one side of the condenser core part in the horizontal direction and successively flows toward the other side of the condenser core part in the horizontal direction, the oil-cooler core part of the oil cooler is integrated with the one side of the condenser core part and wherein the oil cooler is adapted so as to allow the transmission oil to flow in one side of the oil-cooler core part opposite to the other side of the oil-cooler core part integrated with the condenser core part.

In this case, since the condenser's part adjacent to the oil cooler is positioned, in the flow of the refrigerant, on the upstream side where the refrigerant from the inlet is first introduced and therefore heated at high temperature, a temperature difference between the condenser and the oil cooler whose temperature is higher than the condenser is reduced in comparison with an arrangement where the oil cooler is integrated with the downstream side of the condenser, so that there is little influence of heat of the oil cooler on the refrigerant in the condenser.

Additionally, regarding the oil cooler, since the oil-cooler's part on the "low-temperature" downstream side is integrated with the condenser, the thermal influence of the oil cooler on the refrigerant is reduced.

According to the sixth aspect of the present invention, in the heat exchanger of the fifth aspect, the oil cooler further includes an oil passage arranged on at least either side of the oil-cooler core part in the vertical direction of the heat exchanger and also arranged in a space ahead of the radiator. Further, the oil passage is formed so as to allow the transmission oil to flow therein in mutually-opposite directions and the oil passage is provided, on one side thereof apart from the condenser in the horizontal direction of the heat exchanger, with an inlet through which the transmission oil is introduced into the oil passage and an outlet through which the transmission oil is discharged from the oil passage.

Also in this case, owing to the above structure of the oil passage and the above arrangement of the inlet and the outlet for oil, it is possible to improve the efficiency in operation to connect the oil cooler to a transmission mechanism.

According to the seventh aspect of the present invention, in relation to the heat exchanger of the fourth aspect, it further comprises a block having an introductory port formed therein for connection with the inlet of the refrigerant passage and a drain port formed therein for connection with the outlet of the refrigerant passage, wherein the introductory port is provided, on an opening side thereof, with a tapered part and the drain port is provided, on an opening side thereof, with a tapered part.

In this case, since the tapered parts are formed on the opening sides of the introductory port and the drain port of the block, even if the distance between the axes of the integrated pipe members has a dispersion, it is possible to perform the connecting operation of the block while absorbing the dispersion, improving the efficiency of the connecting operation.

According to the eighth aspect of the present invention, in relation to the heat exchanger of the seventh aspect, one of the introductory port and the drain port is convex-shaped, while the other of the introductory port and the drain port is concave-shaped. Further, the convex-shaped port is adapted so that its outer periphery comes into contact with an end of one of the pipe members through the tapered part, while the concave-shaped port is adapted so that its inner periphery comes into contact with an end of the other one of the pipe members through the tapered part.

In this case, it is possible to prevent the block from being connected to the pipe members by mistake.

According to the ninth aspect of the present invention, in relation to the heat exchanger of the fourth aspect, the communication part is formed by a cylindrical joint having upper and lower tapered portions. Further, the pipe members are provided, at corresponding positions thereof, with insertion holes respectively. The upper and lower tapered portions of the cylindrical joint are fitted to the insertion holes of the pipe members under pressure, whereby the pipe members are communicated with each other.

In this case, owing to the adoption of the cylindrical joint having upper and lower tapered portions, the air-tightness between the joint and the insertion holes in the pipe members can be enhanced in comparison with the adoption of a joint in the form of a straight cylinder.

According to the tenth aspect of the present invention, in relation to the heat exchanger of the fourth aspect, the pipe member for connection with the drain port of the block has an outer diameter larger than an outer diameter of the pipe member for connection with the introductory port of the block.

Then, since the pipe member for passage of the refrigerant in gas state has an outer diameter larger than that of the pipe member for passage of the refrigerant in liquid state, it is possible to reduce the flowing resistance of the refrigerant in liquid state, allowing the refrigerant to be circulated smoothly.

These and other objects and features of the present invention will become more fully apparent from the following description and appended claims taken in conjunction with the accompany drawings.

DETAILED DESCRIPTION OF THE PREFERRED EMBODIMENT

Embodiments of the present invention will be described with reference to accompanying drawings.

$1^{st}$. Embodiment

Figure 1:
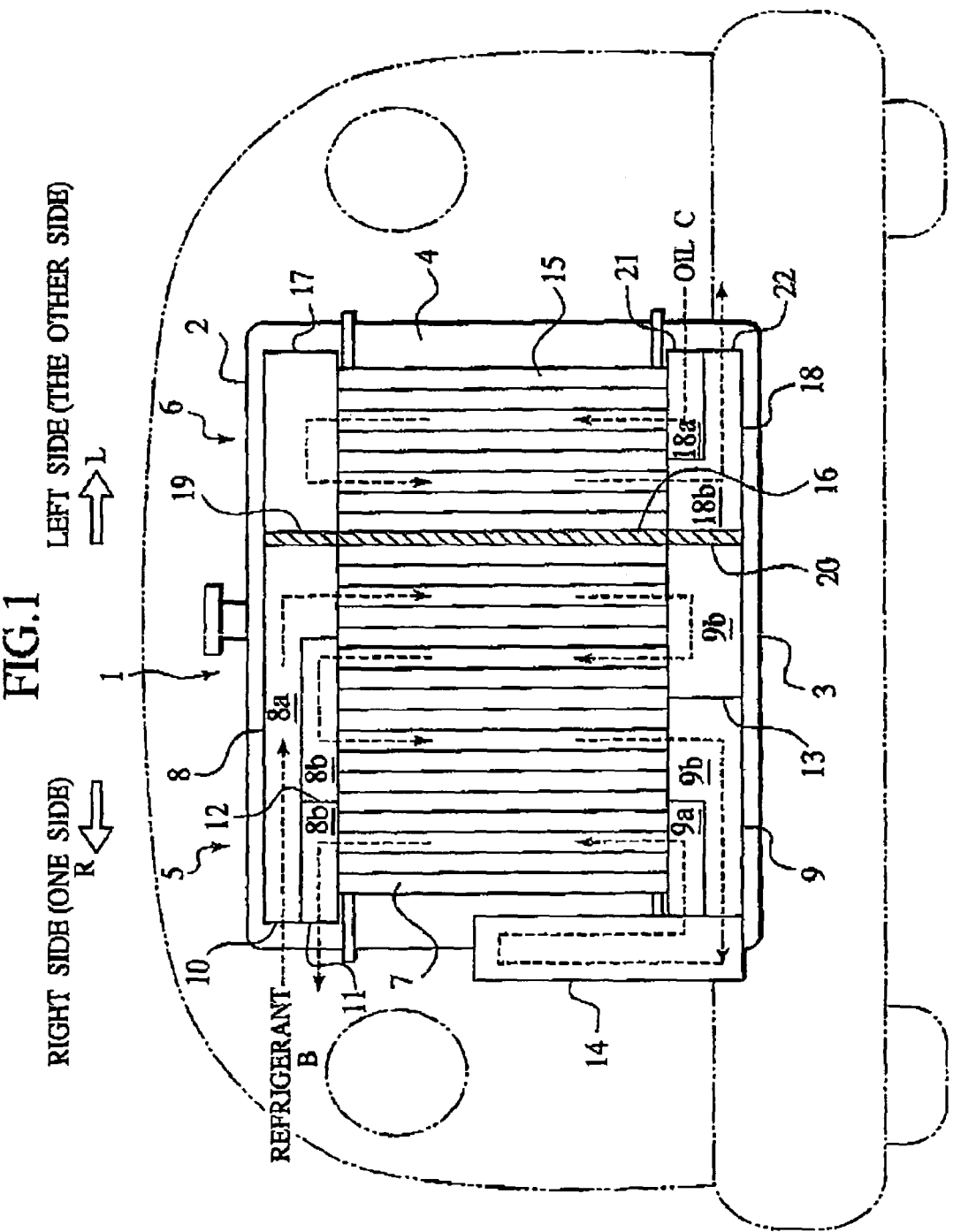
FIG. 1 is a front view of a heat exchanger in accordance with the first embodiment of the present invention, showing a radiator and a condenser both forming the heat exchanger.
Figure 2:
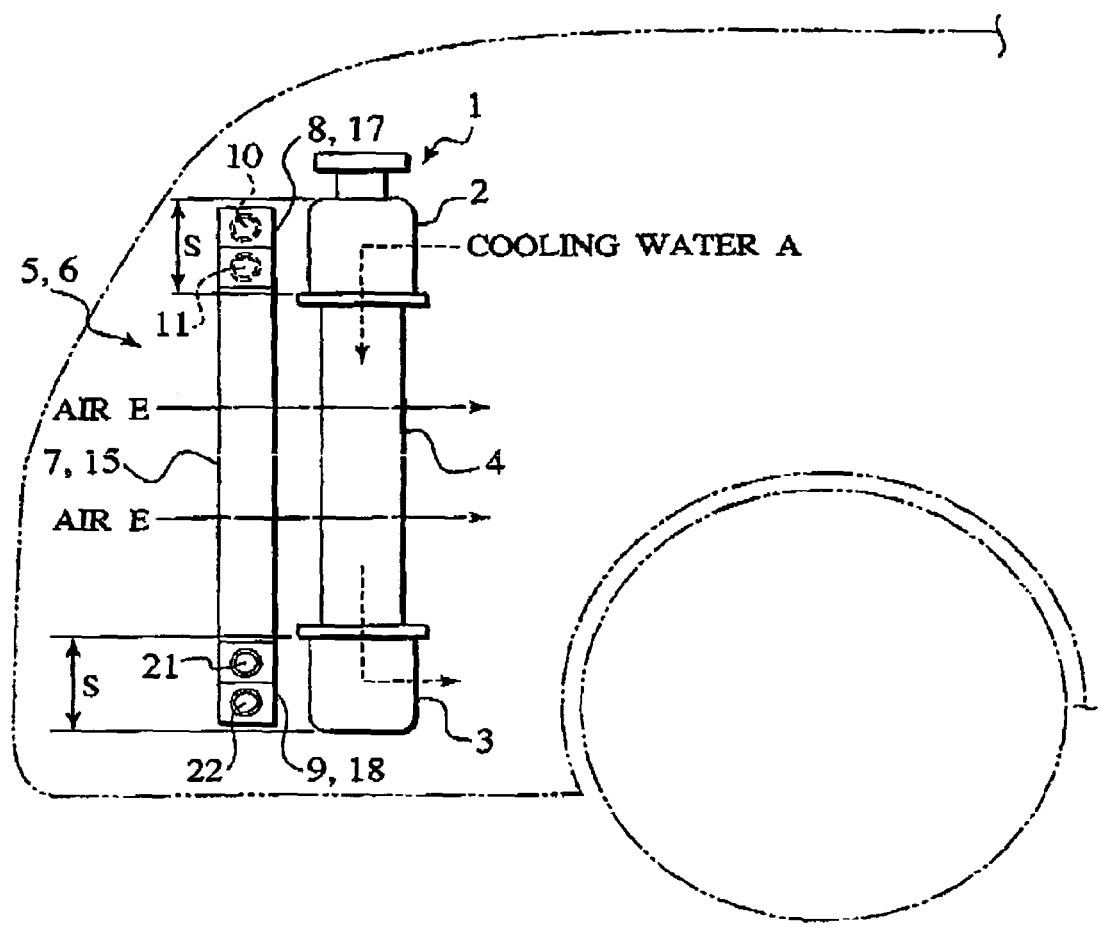
FIG. 2 is a side view of FIG. 1.

FIGS. 1 and 2 are the first embodiment of the present invention. Noted, in FIG. 1, one side in the horizontal direction shown with an arrow R designates the right side in the traveling direction of a vehicle. This side may be also referred "one side in the horizontal (left-and-right) direction" in the following description. While, the other side in the horizontal direction shown with an arrow L denotes the left side in the traveling direction of the vehicle. Accordingly, this side may be also referred "the other side in the horizontal (left-and-right) direction" in the following description.

A heat exchanger of the first embodiment includes a radiator 1 arranged in the front area of a well-known engine room shown in broken lines) on the front side of the vehicle. FIG. 2 is a side view of FIG. 1. In the figure, the left side in the horizontal direction corresponds to a side close to a front part of the vehicle, while the right side in the horizontal direction corresponds to a side close to a rear side of the vehicle. As obvious from FIG. 2, the radiator 1 comprises an upper tank 2, a lower tank 3 and a core part 4 interposed between the upper tank 2 and the lower tank 3. The core part 4 forms a heat exchanging area in the heat exchanger of the illustrated embodiment. Regarding the flow of refrigerant in the radiator 1, it is noted that cooling water A, which is at a high temperature is fed from an engine unit (not shown but well known) and is first supplied to the upper tank 2 and subsequently, the core part 4. During the passage of the cooling water A through the core part 4, the cooling water A is cooled down by air E passing through the core part 4. The so-cooled cooling water is returned to the above engine unit by way of the lower tank 3.

Ahead of the radiator 1 constructed above, there are a condenser 5 for cooling a refrigerant B for air-conditioning cycle and an oil cooler 6 for cooling a transmission oil C for an automatic transmission car, in one body. As shown in FIG. 2, the oil cooler 6 is integrally connected with the condenser 5, on its left side L.

First, the structure of the condenser 5 will be described below. The condenser 5 comprises a core part 7 formed with a plurality of tubes for circulating a refrigerant B and numerous radiate fins each between the adjacent (or unadjacent) tubes, and refrigerant passages 8, 9 arranged on both sides of the core part 4 in the vertical direction. Noted, the core part 7 may be referred "condenser core part" hereinafter, in view of distinguishing it from the other core parts of the other constituents. In measurement of the vertical direction, as shown in FIG. 2, the condenser core part 7 is smaller than the vertical dimension of the whole radiator 1 including the tanks 2, 3. Further noted, the upper and lower refrigerant passages 8, 9 interposing the condenser core part 7 are disposed in spaces S, S being present ahead of the tanks 2, 3, respectively.

Conventionally, these spaces S, S used to accommodate refrigerant pipes called "header" each having small vertical dimensions. While, according to the embodiment, the refrigerant passages 8, 9 are formed in enlargement so as to spread throughout these spaces S, S, respectively.

According to the embodiment, the upper refrigerant passage 8 is partitioned to an upper passage 8a and a lower passage 8b vertically. The right-side end (left side in FIG. 1) of the upper passage 8a forms an inlet 10 for the refrigerant B, while the right-side end (left side in FIG. 1) of the lower passage 8b forms an outlet 11 for the refrigerant B. Both of the inlet 10 and the outlet 11 are connected to an air conditioning cycle by means of pipes. In connecting the upper refrigerant passage 8 to the air conditioning cycle, as the inlet 10 and the outlet 11 are together formed in the same position on the right side R (see FIG. 1), it enables an operator (worker) to perform the connecting operation of the inlet 10 and the outlet 11 in the same position and also above the radiator 1, with improved assembling efficiency.

While remaining the upper side of the condenser core part 7 on the side of the oil cooler 6, the lower passage 8b is connected to respective upper ends of tubes forming the condenser core part 7. The lower passage 8b is divided into two parts by a partition 12. On surmounting the lower passage 8b, the upper passage 8a is connected to the so-remained upper side of the condenser core part 7 on the side of the oil cooler 6.

Meanwhile, the lower refrigerant passage 9 is divided into an upper passage 9a and a lower passage 9b. The upper passage 9a is connected to the lower side (on the right side R only) of the condenser core part 7. The other lower side of the condenser core part 7 except the so-connected lower side (on the right side R only) of the part 7 is connected to the lower passage 9b extending over the upper passage 9a. The lower passage 9b is divided into two parts by a partition 13. The right-side ends of the upper passage 9a and the lower passage 9b are connected to a liquid tank 14.

The refrigerant B introduced from the inlet 10 of the upper refrigerant passage 8 enters the condenser core part 7 through the furthest end from the inlet 10 and flows downwardly. Subsequently, the refrigerant B is turned at the lower passage 9b and flows in the condenser core part 7 upwardly. Then, the refrigerant B is again turned at the lower passage 8b and flows in the condenser core part 7 downwardly and into the liquid tank 14 by way of the lower passage 9b.

Due to the phase change of the refrigerant B from gas to liquid before its entering the liquid tank 14, the refrigerant B in the form of liquid enters the liquid tank 14. Thereafter, the refrigerant B, which rises in the right-side end of the core part 7 through the upper passage 9a succeeding to the liquid tank 14, passes through the lower passage 8b and is returned to the air conditioning cycle through the outlet 11. In this way, it is possible to load the refrigerant B, which has been introduced from the inlet 10, from the furthest position from the inlet 10 into the condenser core part 7 and also possible to finally pick up the refrigerant B from the outlet 11 at the same position as the inlet 10 after circulating the refrigerant B in the core part 7.

It is noted that in each of the upper and lower refrigerant passages 8 and 9, vertically-overlapping parts between the upper passage 8a (9a) and the lower passage 8b (9b) have flowing directions of the refrigerant B opposite to each other. In other words, the above vertically-overlapping parts of the passages 8, 9 are in the opposite-current condition of the refrigerant B. In this way, according to the embodiment, since the refrigerant passages 8, 9 are enlarged so as to have structures each allowing the refrigerant B to flow therein to the opposite directions to each other, it is possible, in the upper refrigerant passage 8, to form the inlet 10 and the outlet 11 at the same position and also possible, in the lower refrigerant passage 9, to arrange the liquid tank 14 on the downstream side of the flowing route of the refrigerant B.

Next, the structure of the oil cooler 6 will be described below. The oil cooler 6 includes a core part 15 integrated with the condenser core part 7 while interposing a forged tube 16 having no refrigerant flowing therein. Noted, the core part 15 may be referred to an "oil-cooler core part" hereinafter. The reason why the forged tube 16 is interposed between the core parts 7 and 15 is to moderate heat influence from the oil cooler 6 on the condenser 5 as possible. As similar to the condenser 5, the oil cooler 6 is provided, on both sides in the vertical direction, with upper and lower oil passages 17, 18. These oil passages 17, 18 are insulated from the refrigerant passages 8, 9 by upper and lower partitions 19, 20, respectively. Although being partitioned by the partitions 19, 20, the oil passages 17, 18 are formed so as to integrally succeed to the refrigerant passage 8, 9, respectively.

With enlargement into the space S in front of the lower tank 3 of the radiator 1, the lower oil passage 18 of the oil cooler 6 is divided into an upper passage 18a and a lower passage 18b. The left-side end of the upper passage 18a forms an inlet 21 for oil, while the left-side end of the lower passage 18b does form an outlet 22 for oil. Also in this oil cooler 6, since the inlet 21 and the outlet 22 are formed on the same side in the horizontal direction and also on the underside of the oil cooler 6 close to a transmission unit, the connecting operation between the oil cooler 6 and the transmission unit can be facilitated with improved efficiency.

The upper passage 18a of the lower oil passage 18 is connected to the lower side (on the left side L only) of the oil-cooler core part 15. The lower passage 18b extending over the upper passage 18a is connected to the other lower side of the oil-cooler core part 15 closer to the condenser 5. While, without being separated vertically, the upper oil passage 17 is connected to the whole upper side of the oil-cooler core part 15.

Therefore, oil C introduced from the inlet 21 into the upper passage 18a rises in the left-side part (right in the figure) of the oil-cooler core part 15. Thereafter, the oil is turned over at the upper oil passage 17 and falls on the right side (closer to the condenser 5) of the oil-cooler core part 15. Subsequently, by way of the lower passage 18b, the oil is returned to the transmission unit through the outlet 22.

Thus, since the condenser's part adjacent to the oil cooler 6 (i.e. the left-side part of the condenser 5) is positioned, in the flow of the refrigerant B, on the upstream side where the refrigerant B from the inlet 10 is first introduced and therefore heated at high temperature, a temperature difference between the condenser 5 and the oil cooler 6 where the oil C having its temperature higher than that of the refrigerant B does flow is reduced in comparison with an arrangement where the oil cooler 6 is integrated with the downstream side of the condenser 5, so that there is little influence of heat of the oil cooler 6 on the refrigerant B in the condenser 5. Namely, there is no possibility that the refrigerant B whose temperature has been lowered by the condenser core part 7 is heated again by heat of the oil cooler 6.

Additionally, regarding the oil cooler 6, since the oil-cooler's part on the "low-temperature" downstream side in the flow of the oil C (i.e. the right-side part of the oil cooler 6) is integrated with the condenser 5, the thermal influence of the oil cooler 6 on the refrigerant B is reduced in comparison with an arrangement where the oil-cooler part on the "high-temperature" upstream side in the flow of the oil C is integrated with the condenser 5.

2$^{nd}$. Embodiment

Figure 3:
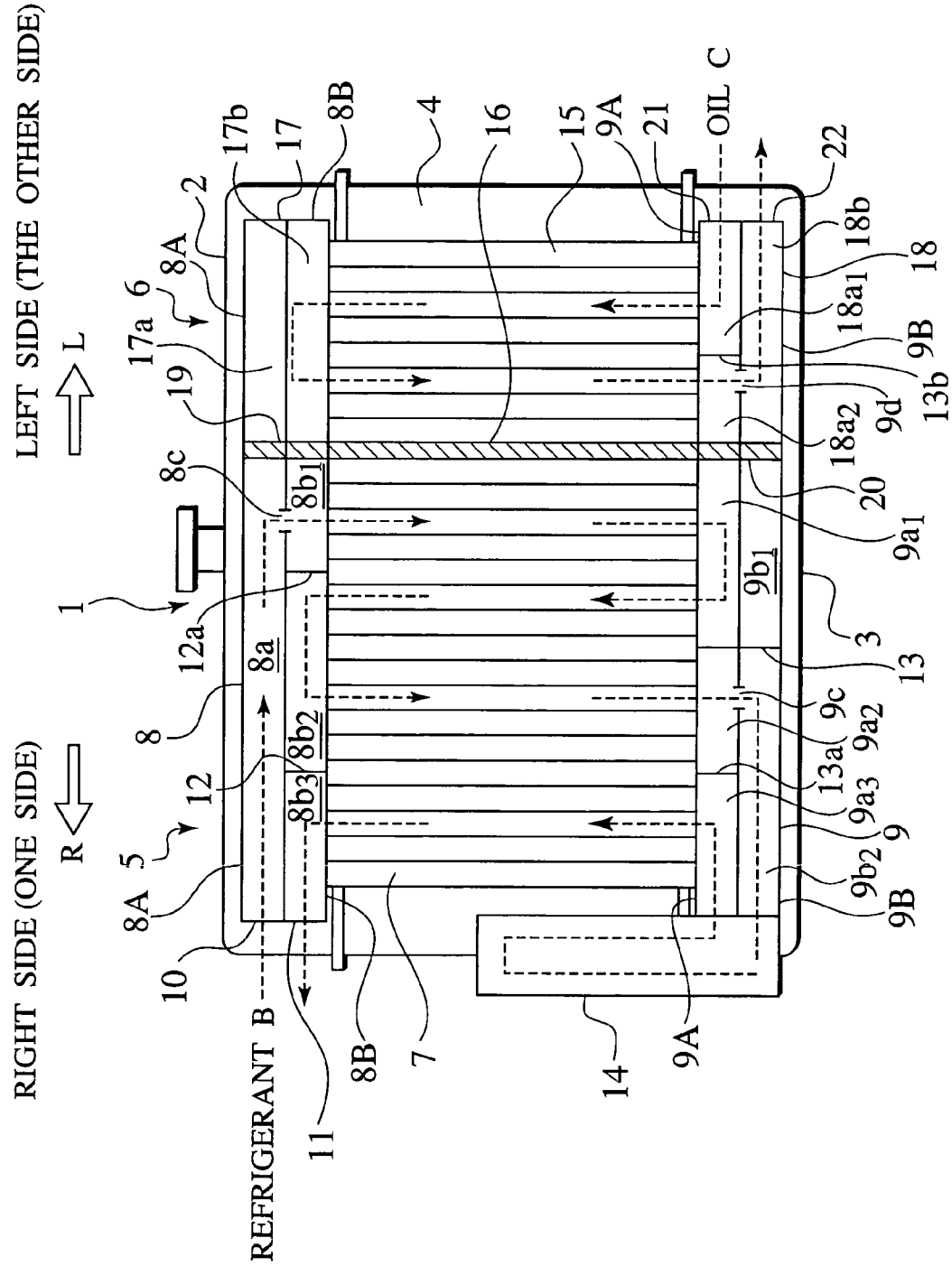
FIG. 3 is a front view of a heat exchanger in accordance with the second embodiment of the present invention, showing a radiator and a condenser both forming the heat exchanger.
Figure 4:
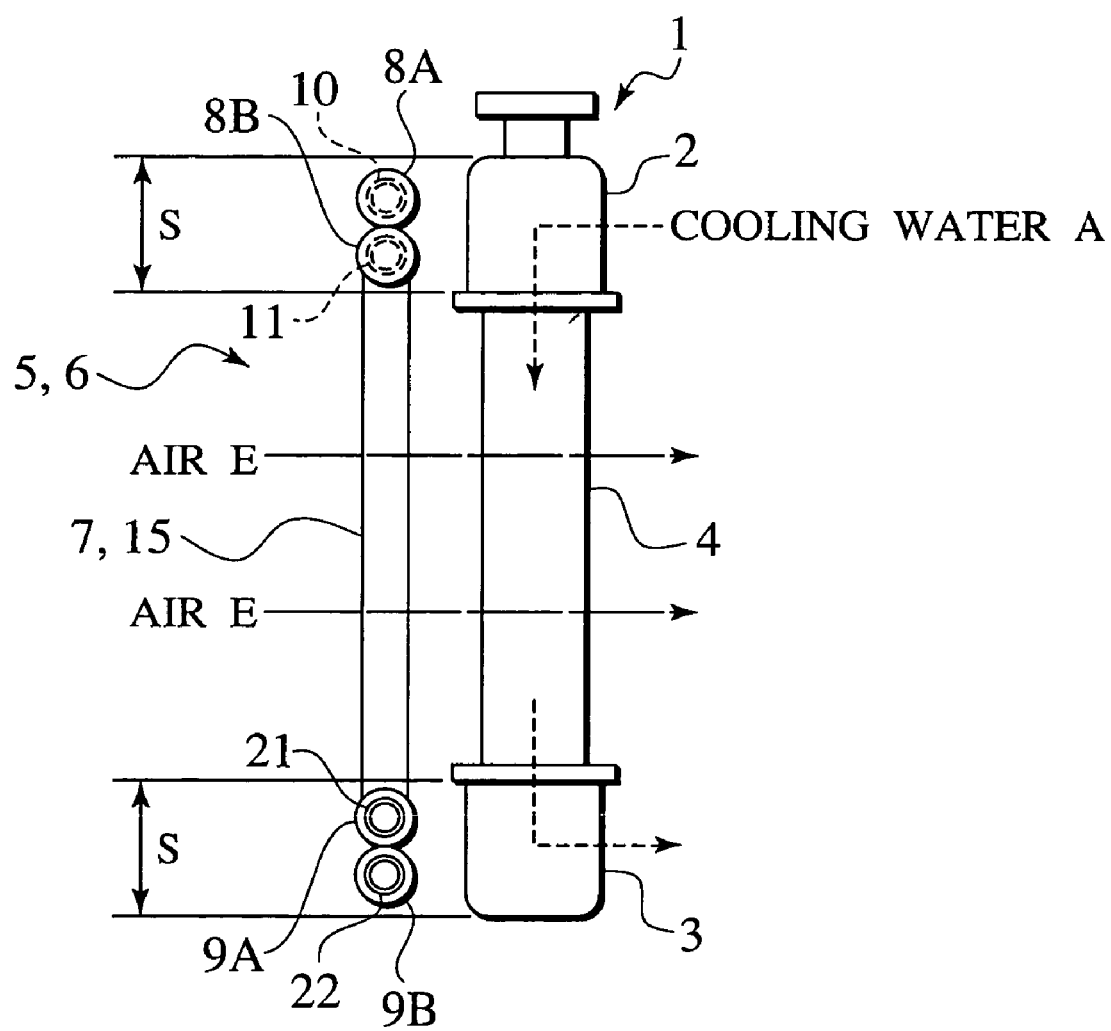
FIG. 4 is a side view of FIG. 1.

The second embodiment of the present invention will be described below. FIGS. 3 and 4 show the second embodiment. Regarding the radiator 1, the condenser 5 and the oil cooler 6, their basic structures are similar to those of the first embodiment. The second embodiment differs from the first embodiment in the structures of the refrigerant passages 8, 9 of the condenser 5 and the oil passage 17, 18 of the oil cooler 6. Noted, in the second embodiment, elements similar to those in the first embodiment are indicated with the same reference numerals, respectively.

The upper refrigerant passages 8 and 17 are formed by pipe members 8A, 8B juxtaposed vertically and extending in the horizontal direction. Similarly, the lower refrigerant passages 9 and 18 are also formed by pipe members 9A, 9B. These pipe members 8A, 8B, 9A and 9B are partitioned to respective condenser sections and oil-cooler sections by partitions 19, 20.

In the condenser section, an upper passage 8a of the pipe member 8A is provided, on the right side R, with an inlet 10 for the refrigerant B. While, the lower passage of the pipe member 8A is divided into three passages $8b_1$, $8b_2$ and $8b_3$ by partitions 12, 12a. The upper passage 8a is communicated with the passage $8b_1$ adjacent to the oil cooler 6 through a communication part 8c. The refrigerant B entering from the inlet 10 flows from the upper passage 8a to the passage $8b_1$ via the communication part 8c and flows in the condenser core part 7 downwardly. In the condenser section, the pipe member 9A is divided into three passages $9a_1$, $9a_2$ and $9a_3$ by partitions 13, 13a. While, the pipe member 9B is divided into two passages $9b_1$, $9b_2$ by the partition 13. The refrigerant B flowing from the passage $8b_1$ into the condenser core part 7 enters the passage $9a_1$ of the pipe member 9A and further turns upwardly as being apart from the oil cooler 6. After passing through the condenser core part 7, the refrigerant B enters the passage $8b_2$. At the passage $8b_2$, the refrigerant B turns back downwardly and enters the passage $9a_2$ of the pipe member 9A through the condenser core part 7. Here, the passage $9a_2$ of the pipe member 9A is communicated with the passage $9b_2$ of the pipe member 9B through a communication part 9c.

Therefore, the refrigerant B entering the passage $9b_2$ of the pipe member 9B through the communication part 9c flows into the passage $9b_2$ of the pipe member 9B. Subsequently, the refrigerant B enters the passage $9a_3$ of the pipe member 9A by way of the liquid tank 14 on the right side R of the condenser 5. Thereafter, the refrigerant B enters the condenser core part 7 and finally reaches the outlet 11 by way of the passage $8b_3$. Noted that the passage $9b_1$ on the left side L of the pipe member 9B is closed so as not to allow entering of a refrigerant or the like.

The lower pipe member 9A is divided, on the side of the oil cooler 6, into two passages $18a_1$, $18a_2$ by a partition 13b. The passage 18a is communicated with an inlet 21 for the oil C. The pipe member 9B is provided, on the side of the oil cooler 6, with a passage 18b which is communicated with the above passage $18a_2$ adjacent to the condenser 5 through a communication part 9d. The oil C entering the passage $18a_1$ via the inlet 21 flows in the oil-cooler core part 15 (the left side L) upwardly and enters the passage 17b of the pipe member 8B. After turning over at the passage 17b, the oil C flows in the oil-cooler core part 15 on the side of the condenser 5 downwardly and enters the passage $18a_2$ of the pipe member 9B, adjacent to the condenser 5. Successively, the oil C enters the passage 18b of the pipe member 9B through the communication part 9d and finally reaches an outlet 22 formed on the left side L of the passage 18b. Noted that the passage 17a on the left side L of the pipe member 8A is closed so as to refuse entering of a refrigerant or the like.

According to the second embodiment of the present invention, since the passages for the refrigerant B and the oil C are formed by two pipe members juxtaposed vertically and as occasion demands, the pipe members are provided, therein, with the communication parts and the partitions, it is possible to manufacture the heat exchanger relatively easily.

Figure 5:
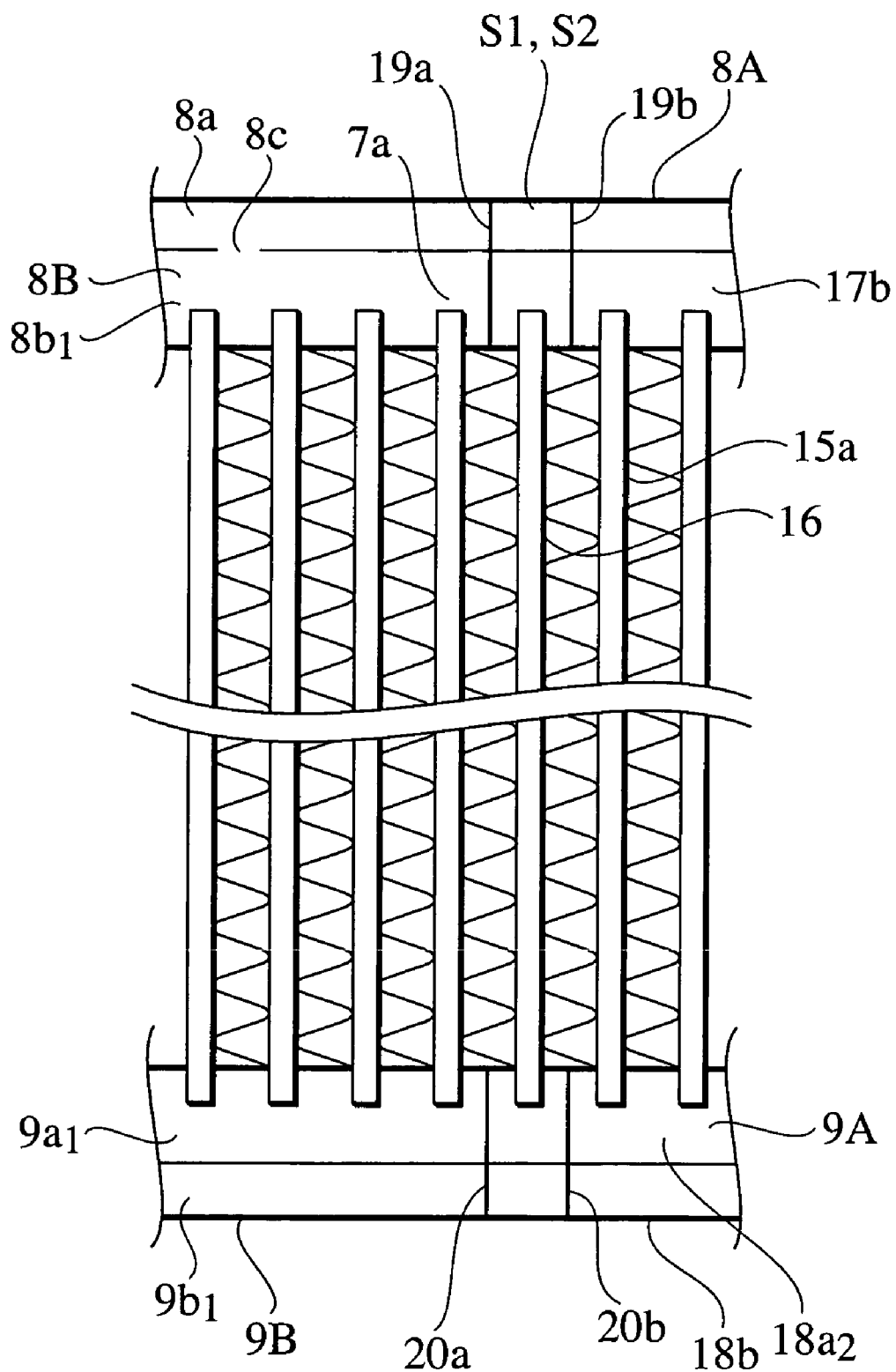
FIG. 5 is a partial enlarged view in the vicinity of pseudo-tube of FIG. 3.

FIG. 5 is an enlarged view of the vicinity of the forged tube 16 between the condenser 5 and the oil cooler 6. As will be understood from this figure, by providing a partition plate 19a in the pipe members 8A, 8B and between the tube 7a of the condenser 5 on the side of the oil cooler 6 and the forged tube 16 and further providing a partition plate 19b in the pipe members 8A, 8B and between the tube 15a of the oil cooler 6 on the side of the condenser 5 and the forged tube 16, it is possible to define two spaces S1, S2 accommodating neither the refrigerant B nor the oil C in the pipe members 8A, 8B, whereby the thermal influence of the oil cooler 6 on the condenser 5 can be reduced furthermore. Similarly, owing to the provision of partition plates 20a, 20b in the lower pipe members 9A, 9B, it is possible to take the similar effect.

It is noted that, in common with the first and second embodiments, the present invention is embodied by example of a heat exchanger having the radiator 1 equipped with the tanks 2, 3 above and below the radiator core part 4. In the modification, the present invention may be applied to a heat exchanger having a radiator which is provided, on both sides thereof in the horizontal direction, with tanks.

3$^{rd}$. Embodiment

Figure 6:
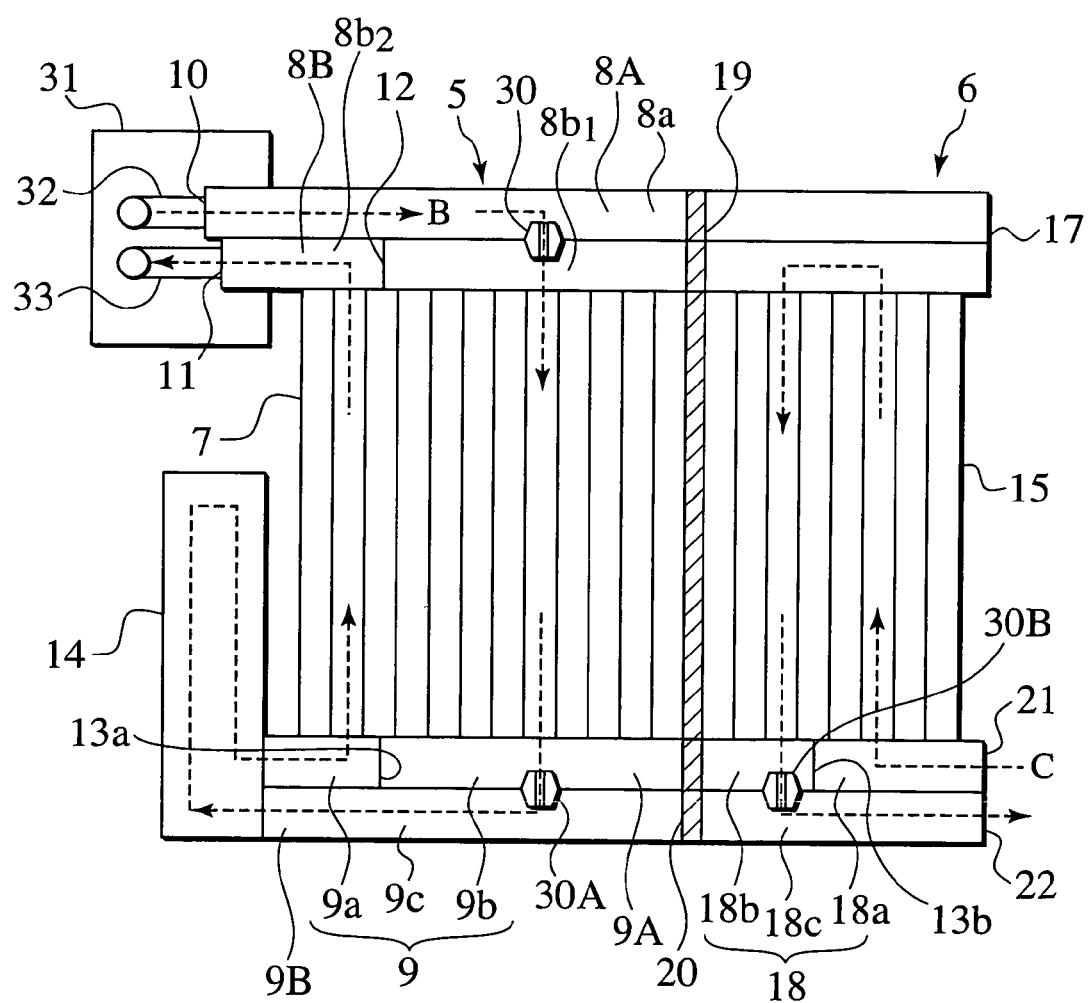
FIG. 6 is a front view showing a condenser in accordance with the third embodiment of the present invention.

FIG. 6 shows the third embodiment of the present invention. According to this embodiment, similarly to the second embodiment, the pipe members 8A, 8B are juxtaposed above the condenser core part 7 and the oil-cooler core part 15, extending in the horizontal direction. Further, the pipe members 9A, 9B are juxtaposed below the condenser core part 7 and the oil-cooler core part 15, also extending in the horizontal direction.

These pipe members 8A, 8B are in the form of circular pipes. The diameter of the pipe member 8B is larger than that of the pipe member 8A. The pipe member 8B serves to discharge the refrigerant in liquid state from the outlet formed on the end of the member 8B. Owing to the above establishment in diameter of the pipe members 8A, 8B, it is possible to reduce the flowing resistance of the so-liquefied refrigerant B in the pipe member 8B, making the overall circulation of the refrigerant B in the heat exchanger smooth. The pipe members 9A, 9B are also in the form of circular pipes.

To respective upper ends of the tubes 7a, 15a forming the core parts 7, 15, the pipe member 8B is connected in communication with the tubes 7a, 15a. Similarly, the pipe member 9A is connected to respective lower ends of the tubes 7a, 15a communicatively. In FIG. 6, the left end of the pipe member 8B (i.e. end on the right side in the traveling direction of a vehicle) does form the outlet 11 for discharging the refrigerant B. The pipe member 8A is attached on the pipe member 8B. The left end of the pipe member 8A forms the inlet 10 for introducing the refrigerant B. In the horizontal direction, the inlet 10 is positioned so as to somewhat project from the outlet 11.

As similar to the previous embodiments, by the partition (heat insulation wall) 19, the pipe members 8A, 8B are partitioned left and right to form the refrigerant passages 8a, 8$b_1$ and 8$b_2$ on the side of the condenser 5 (left side in FIG. 6) and the oil passage 17 for the oil C on the side of the oil cooler 6 (right side in FIG. 6). At the same position to the partition 19 in the horizontal direction, the lower pipe members 9A, 9B are also partitioned by the partition (heat insulation wall) 20 to form the refrigerant passage 9 (9a, 9b, 9c) for the refrigerant B on the side of the condenser 5 and the oil passage 18 for the oil C on the side of the oil cooler 6. Noted that a passage of the pipe member 8A on the right side (i.e. anti-condenser side) of the partition 19 is closed up so as to refuse entering of the refrigerant or the like. The pipe member 9A is attached on the pipe member 9B.

In the pipe member 9A, the lower oil passage 18 of the oil cooler 3 is divided, on the anti-condenser side (i.e. the right side in FIG. 6) of the partition 20, into the upper-and-right passage 18a and the upper-and-left passage 18b adjacent to the condenser 5 by the partition 13b. Further, the pipe member 9B is provided, on the anti-condenser side of the partition 20, with the lower passage 18c. The inlet 21 for the oil C is formed on the right end of the upper passage 18a, while the outlet 22 for the oil C is formed on the right end of the lower passage 18c. The upper-and-left passage 18b is communicated with the lower passage 18c through a cylindrical joint 30B in the form of a Japanese abacus piece. The cylindrical joint 30B is formed by a rotating body having a generally-hexagonal longitudinal section and also provided with upper and lower tapered portions. In connection, the upper and lower ends of the joint 30A are inserted into the passages 18b, 18c, respectively. Note, the upper pipe member 8B is provided, on the anti-condenser side of the partition 19, with the upper oil passage 17.

In the pipe member 8A forming the condenser 5, the upper refrigerant passage 8a is defined on the left (condenser's side) of the partition 19. Below the refrigerant passage 8a, the interior of the pipe member 8B is partitioned by the partition 12 thereby forming the refrigerant passages 8$b_1$ and 8$b_2$ on the condenser's side of the partition (heat insulating wall) 19. At the same position as the partition 12 in the horizontal direction, the interior of the pipe member 9A is also partitioned by the partition 13a thereby forming the refrigerant passages 9a, 9b. The upper-and-right passage 9b is communicated with the lower passage 9c through a cylindrical joint 30A in the form of a Japanese abacus piece. Similarly to the joint 30B, the cylindrical joint 30A is formed by a rotating body having a generally-hexagonal longitudinal section and also provided with upper and lower tapered portions. In connection, the upper and lower ends of the joint 30A are inserted into the passages 9b, 9c, respectively. The liquid tank 14 is connected to both ends of the passage 9a and the passage 9c on the anti-oil cooler side (i.e. the left side of FIG. 6).

Figure 7:
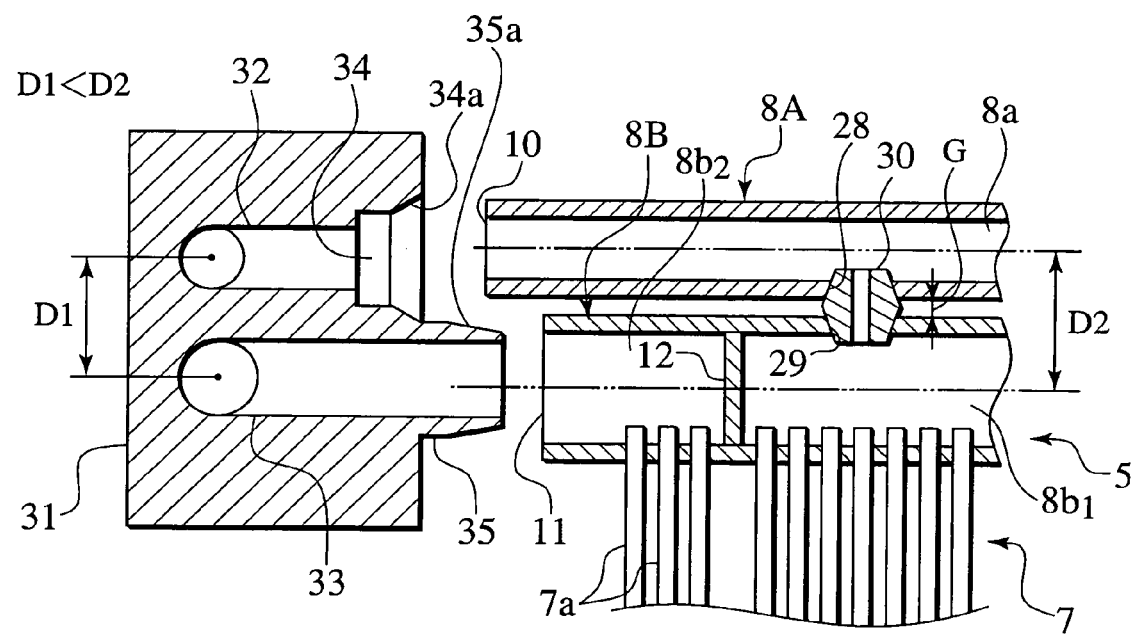
FIG. 7 is a sectional view of an essential part of FIG. 6, showing a condition before connecting a block to pipe members.

Next, the structures of the pipe members 8A, 8B on the left (condenser's) side of the partition 19 will be described with reference to FIG. 7. At positions of the pipe members 8A, 8B slightly apart from the partition 12 (on the oil-cooler's side), insertion holes 28, 29 are formed in the pipe members 8A, 8B, respectively. Inserted into these insertion holes 28, 29 is a cylindrical joint 30 that is in the form of a Japanese abacus piece. Similarly to the joint 30A, the cylindrical joint 30 is also formed by a rotating body having a generally-hexagonal longitudinal section and also provided with upper and lower tapered portions. Since the lower pipe member 8B is urged from its upside by the upper pipe member 8A, the upper and lower ends of the joint 30 are fitted into the insertion holes 28, 29 under pressure. It is noted that, in this state, the pipe member 8A is not welded to the pipe member 8B but the former is only urging the latter.

According to the embodiment, by insertion, a block 31 is connected to the outlet 11 of the pipe member 8B and the inlet 10 of the pipe member 8a, in common. Here noted that the block 31 is provided to connect the pipe members 8A, 8B with not-shown pipes on the side of an air conditioning cycle. The block 31 is formed, therein, with two upper and lower passages 32, 33 bent in L-shaped manner.

The upper passage 32 is continuous to a concave introductory port 34 formed in the block 31. While, the lower passage 33 is continuous to a convex drain port 35 projecting from the block 31. The introductory port 34 has a base part equal to the outer diameter of the pipe member 8A. Further, the same port 34 is provided, on its opening side, with a tapered part 34a whose diameter is gradually increased. While, the drain port 35 has a base part equal to the inner diameter of the pipe member 8B. Further, the same port 35 is provided, on its opening side, with a tapered part 35a whose diameter is gradually decreased.

The projecting distance of the convex drain port 35 is established larger than a horizontal difference between the inlet 10 and the outlet 11. As a result, when making the introductory port 34 and the drain port 35 of the block 31 approach the inlet 10 and the outlet 11 respectively, the convex drain port 35 first abuts against the outlet 11 and thereafter, the introductory port 34 comes into contact with the inlet 10 with a time delay.

Figure 10:
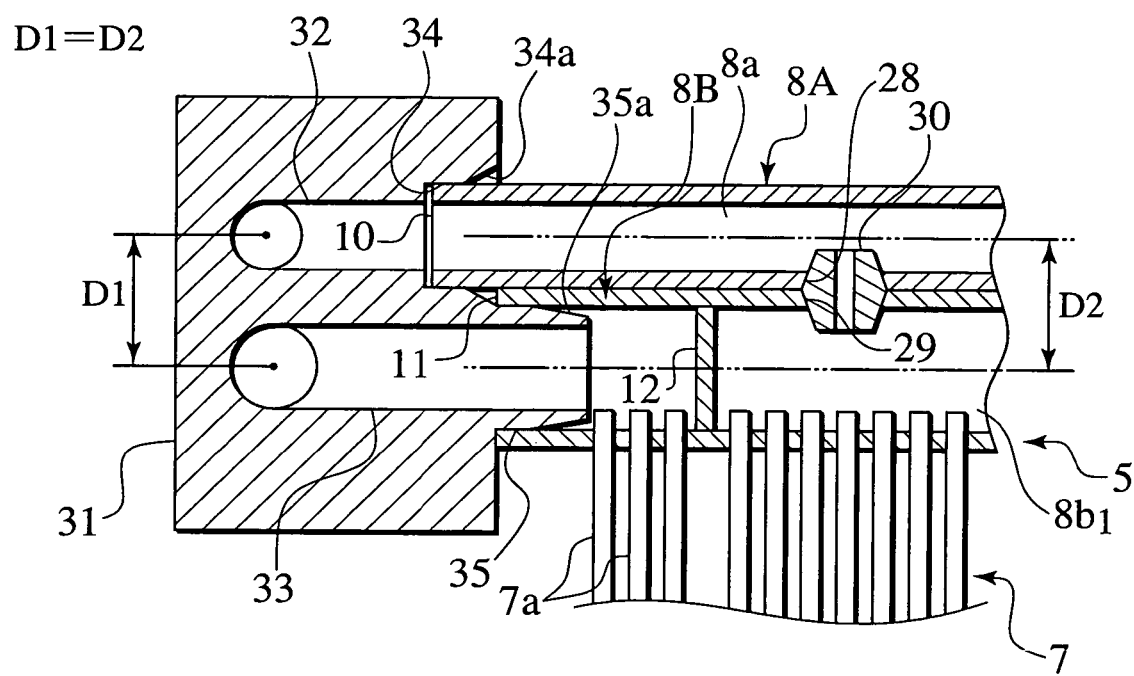
FIG. 10 is a sectional view of an essential part of FIG. 6, showing a condition where the block of FIG. 7 is connected to the pipe members completely.

In the block 31, a distance D1 between the center of the introductory port 34 and the center of the drain port 35 is equal to a formal distance D2 (see FIG. 10) between the axis of the pipe member 8A and the axis of the pipe member 8B in their closely-adhered condition. The drain port 35 and the introductory port 34 of the block 31 are brazed in welding to the pipe members 8B, 8A after being connected with the outlet 11 and the inlet 10, respectively.

On the other hand, the pipe members 8A, 8B are not definitely brazed to each other including the joint 30 before they are connected to the block 31. Therefore, the above distance D2 between the axes of the pipe members 8A, 8B has a dispersion in the previous stage to the connection with the block 31, so that there is a possibility that the distance D2 becomes larger than the formal distance D1 (see FIG. 7).

In detail, due to residual stress caused by press-fitting both ends of the joint 30 into the insertion holes 28, 29, the upper pipe member 8A may rebound to the lower pipe member 8B, so that a slight gap G is produced between the pipe members 8A and 8B to increase the distance D2 therebetween.

However, according to this embodiment, the block 31 enables the introductory port 34 and the drain port 35 to be respectively engaged with the inlet 10 and the outlet 11 that are separated from each other at such an informal distance D2, easily and certainly.

The engagement of the block 31 with the pipe members 8A, 8B is carried out as follows.

Figure 8:
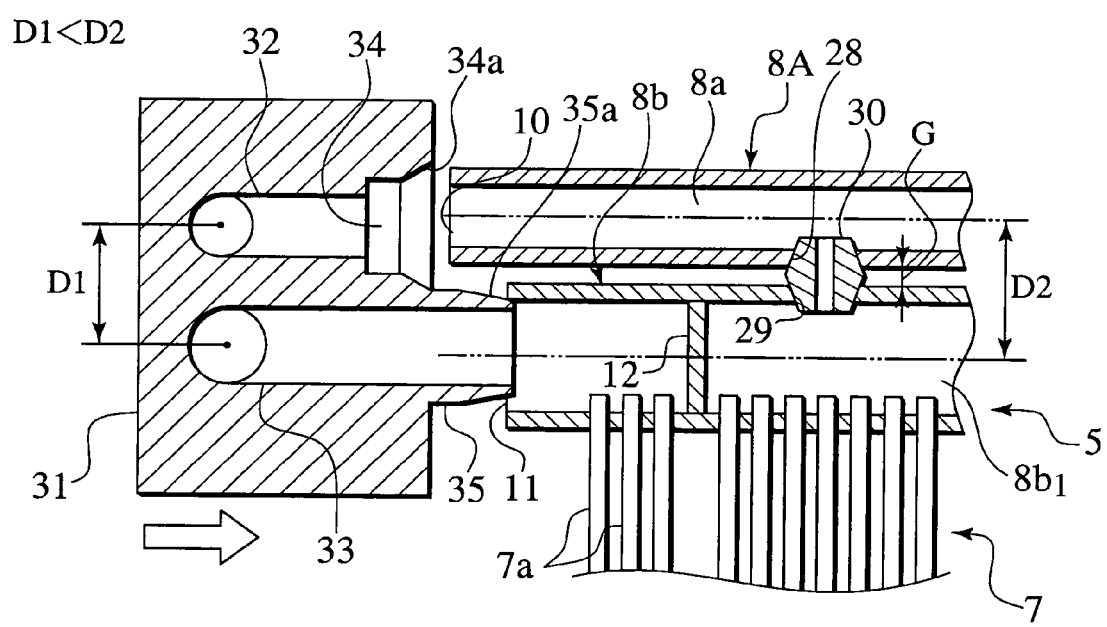
FIG. 8 is a sectional view of an essential part of FIG. 6, showing a condition where a tapered part of a drain port of FIG. 7 abuts on an outlet of the pipe member in advance.

When making the block 31 approach the outlet 11 and inlet 10 in order to fit the block 31 to the pipe members 8B, 8A, the tapered part 35a of the projecting drain port 35 abuts on the outlet 11 firstly, realizing an inserting condition where the outlet 11 comes into contact with the periphery of the tapered part 35a (see FIG. 8). In this way, the position of the outlet 11 in relation to the drain port 35 is fixed generally and subsequently, there exists only a movement of the block 31 in the inserting direction.

Regarding this engagement of the block 31, it should be noted that its structure where the introductory port 34 is concave-shaped and the drain port 35 is convex-shaped allows an operator to identify the top and bottom of the block 31 visually and obviously, whereby it is possible to prevent an occurrence of mistaken connection of the block 31 in its reversed posture.

Figure 9:
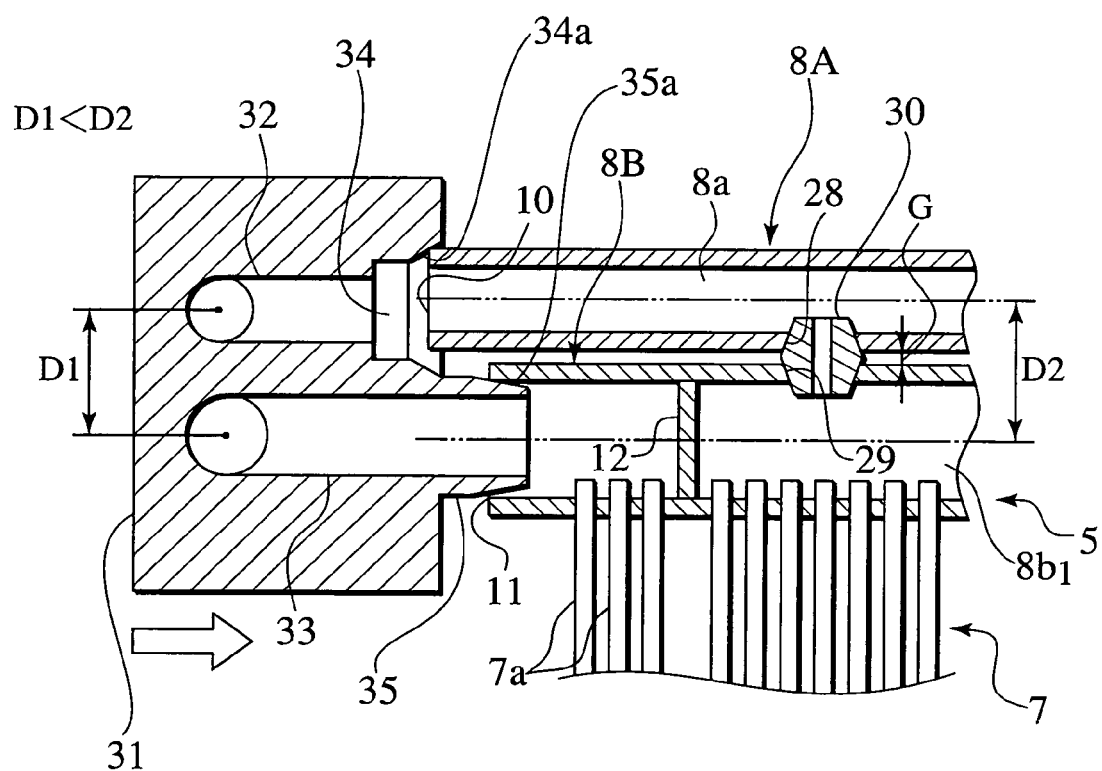
FIG. 9 is a sectional view of an essential part of FIG. 6, showing a condition where a tapered part of an introductory port of FIG. 7 abuts on an inlet of the pipe member with a time delay.

After the drain port 35 has abutted on the outlet 11 in advance, the tapered part 34a of the introductory port 34 comes into abutment with the inlet 10 of the upper pipe member 8A with a time delay, thereby effecting another inserting condition where the inlet 10 comes into contact with an inner periphery of the tapered part 34a of the introductory part 34 (see FIG. 9).

Subsequently, when the insertion of the block 31 is progressed, the outlet 11 slides along the tapered part 35a on the side of the drain port 35 and thereafter, the outlet 11 is fitted to the base part of the drain port 35 finally. Additionally, on the side of the introductory port 34 as well, the inlet 10 slides along the tapered part 34a and thereafter, the inlet 10 is fitted to the base part of the introductory port 34.

Even if there is a gap G between the pipe member 8A and the pipe member 8B to make a distance D2 therebetween larger than the formal distance D1, the above-mentioned structure of the block 31 enables the inlet 10 of the pipe member 8A to be inserted into the base part of the introductory port 34 due to an operator's pulling the inlet 10 of the pipe member 8A along the tapered part 34a and against the pipe member 8B while making the drain port 35 previously inserted into the outlet 11 as an operational reference. Thus, according to the embodiment, it is possible to cancel the gap G in the course of engaging the block 31 with the pipe members 8A, 8B, whereby the block 31 can be connected to the pipe members 8A, 8B in the relationship of D2=D1 (see FIG. 10). In this way, as the provision of the tapered parts 34a, 35a allows the block 31 to be engaged with the pipe members 8A, 8B while correcting the distance D even if there is produced a dispersion in the distance D2 between the pipe members 8A, 8B, it is possible to improve the efficiency of the connecting operation.

Additionally, since both of the inlet 10 of the pipe member 8A and the outlet 11 of the pipe member 8B are formed above the condenser core part 7 and at the substantially-same position on one side of the heat exchanger in the horizontal direction, an operator can perform the operation to connect the block 31 to the inlet 10 and the outlet 11 at the same working position and in the same working posture, lightening the burden on the operator. Further, since the connection of the inlet 10 and the outlet 11 with the pipes of the air conditioning cycle is accomplished by use of the single block 31, the pipe arrangement about the condenser 5 can be simplified to facilitate the installation of the condenser 5 into such a narrowed space in front of a not shown radiator.

Additionally, as mentioned above, the heat exchanger of this embodiment is constructed so that, in the course of engaging the block 31 with the pipe members 8A and 8B, the outlet 11 of the pipe member 8B forming a larger component integrated with the condenser core part 7 abuts on the tapered part 35a of the block 31 in advance of the abutment of the inlet 17 of the pipe member 8A being a smaller component. That is, since the heat exchanger of this embodiment allows an operator to manipulate the pipe member 8A being a small component while making the pipe member 8B forming the large component as an operation reference, it is possible to reduce an operator's force required to urge the block 31 to its insertion direction, facilitating the connecting operation of the block 31.

Figure 11:
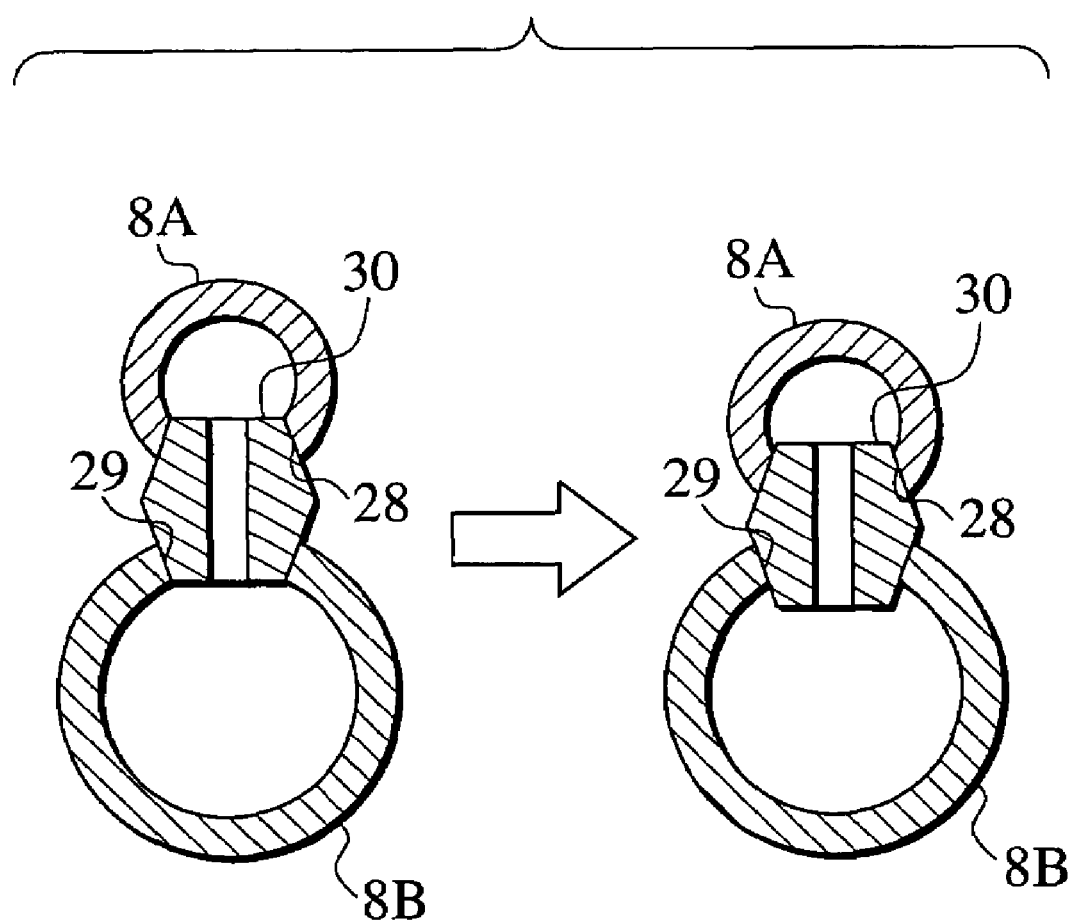
FIG. 11 is a sectional view of an essential part of FIG. 6, showing a condition where a joint is fitted to insertion holes formed in the pipe members under pressure.

The pipe members 8A in engagement with the block 31 are finally subjected, at their essential parts including their connecting parts, to welding. In addition to welding about the joint 30, as shown in FIG. 11, the pipe member 8A is drawn against the pipe member 8B, so that both ends of the joint 30 are fitted to the insertion holes 28, 29 under pressure. Consequently, the air-tightness between the joint 30 and the insertion holes 28, 29 is enhanced sufficiently. Additionally, with the sequent brazing in weld, the air-tightness is completed furthermore.

To the condenser 5 manufactured in this way, as shown in FIG. 6, the gaseous refrigerant B fed from the air conditioning cycle is introduced into the refrigerant passage 8a in the pipe member 8A on the opposite side of the oil cooler 6 by way of the introductory port 34 of the block 31 and the sequent inlet 10. Then, passing through the joint 30, the refrigerant B enters the refrigerant passage $8b_1$ of the pipe member 8B on the oil-cooler's side (right side) of the partition 12 and successively enters the condenser core part 7 on the side of the oil cooler 6. As a result of circulating in the core part 7, the gaseous refrigerant B is cooled down to liquid. Further passing through the refrigerant passage 9b, the cylindrical joint 30A and the lower passage 9c in order, the refrigerant B in liquid state enters the liquid tank 14. Subsequently, passing through the passage 9a, the refrigerant B is fed to the condenser core part 7 apart from the oil cooler 6. After circulating in the core part 7, the refrigerant B passes through the refrigerant passage $8b_2$ of the pipe member 8B and thereafter, the refrigerant B is drained from the passage $8b_2$ to the air conditioning cycle via the outlet 11 and the drain port 35.

In connection with this embodiment, without being limited to only the connection between the condenser 5 and the air conditioning cycle, the arrangement about the block 31, the inlet 10 and the outlet 11 may be applied to the other connection, for example, a connection between the liquid tank 14 and the other pipe members 9A, 9B. Further, the above-mentioned arrangement of this embodiment is also applicable to the other elements forming a heat exchanger, for example, a radiator and an oil cooler. Additionally, in a modification of the arrangement of the cylindrical joints 30, 30A and 30B, a plurality of joints may be juxtaposed between two passages for communication in order to enlarge a flow path area therebetween. Further, the same joint may be formed to have a configuration expanded in the horizontal direction.

Finally, it will be understood by those skilled in the art that the foregoing descriptions are nothing but embodiments of the disclosed heat exchanger is for a vehicle. Besides this embodiment, various changes and modifications may be made to the present invention without departing from the spirit and scope of the invention.

What is claimed is:

1. A heat exchanger for a vehicle, comprising:
   a radiator arranged in an engine room for cooling cooling water for an engine of the vehicle;
   a condenser arranged in front of the radiator in a traveling direction of the vehicle for cooling a refrigerant for an air conditioning cycle of the vehicle, the condenser including a condenser core part allowing the refrigerant to flow therethrough and refrigerant passages arranged on the top and the bottom of the condenser core part for communication with the condenser core part,
   an oil cooler which is integral with the condenser, the oil cooler including an oil-cooler core part allowing a transmission oil of the engine to flow therethrough and oil passages arranged on the top and the bottom of the oil-cooler core part,
   wherein each of the refrigerant passages of the condenser has at least a first passage and a second passage extending lengthwise from an inlet and an outlet respectively, the inlet and the outlet facing toward a first direction at a left or a right side of the condenser core part, and
   wherein the oil passage of the oil cooler arranged on the bottom of the oil cooler core part has a first passage and a second passage extending lengthwise from an oil inlet and an oil outlet respectively, the oil inlet and the oil outlet of the oil passage of the oil cooler arranged on the bottom of the oil cooler care part facing toward a second direction opposite to the first direction.

2. The heat exchanger for the vehicle of claim 1, wherein a vertical height of the condenser is smaller than a vertical height of the radiator.

3. The heat exchanger for the vehicle of claim 1, wherein the refrigerant passage of the condenser is partially partitioned into upper and lower passages, thereby allowing the refrigerant to flow into the upper refrigerant passage in a direction opposite to a direction of an outgoing flow of the refrigerant.

* * * * *